(12) United States Patent
Korsten

(10) Patent No.: US 8,151,601 B2
(45) Date of Patent: Apr. 10, 2012

(54) METHOD FOR MANUFACTURING AN OPTICAL FIBRE

(75) Inventor: Marco Korsten, Eindhoven (NL)

(73) Assignee: Draka Comteq, B.V., Amsterdam (NL)

( * ) Notice: Subject to any disclaimer, the term of this patent is extended or adjusted under 35 U.S.C. 154(b) by 1565 days.

(21) Appl. No.: 10/992,740

(22) Filed: Nov. 22, 2004

(65) Prior Publication Data

US 2005/0204778 A1 Sep. 22, 2005

(30) Foreign Application Priority Data

Dec. 4, 2003 (NL) .................................... 1024943

(51) Int. Cl.
*C03B 37/025* (2006.01)
*C03B 37/029* (2006.01)

(52) U.S. Cl. ................. 65/477; 65/385; 65/384; 65/475

(58) Field of Classification Search .................... 65/384, 65/488, 533–538; 374/9, 10, 112, 137
See application file for complete search history.

(56) References Cited

U.S. PATENT DOCUMENTS

| | | | | |
|---|---|---|---|---|
| 4,157,906 A | * | 6/1979 | Bailey | 65/422 |
| 4,174,842 A | * | 11/1979 | Partus | 277/431 |
| 4,343,638 A | * | 8/1982 | Mitachi et al. | 65/388 |
| 4,383,843 A | * | 5/1983 | Iyengar | 65/435 |
| 4,453,961 A | * | 6/1984 | Berkey | 65/419 |
| 4,801,322 A | * | 1/1989 | Suda et al. | 65/144 |
| 4,820,322 A | | 4/1989 | Baumgart et al. | |
| 4,824,455 A | * | 4/1989 | Rand et al. | 65/431 |
| 4,957,338 A | * | 9/1990 | Thorncraft et al. | 385/43 |
| 4,988,374 A | * | 1/1991 | Harding et al. | 65/435 |
| 5,011,252 A | * | 4/1991 | Thorncraft et al. | 385/43 |
| 5,410,567 A | | 4/1995 | Brundage et al. | |
| 6,381,990 B1 | * | 5/2002 | Ball et al. | 65/483 |
| 6,408,651 B1 | * | 6/2002 | Terrell, Jr. | 65/377 |
| 2002/0029591 A1 | * | 3/2002 | Dickinson, Jr. et al. | 65/379 |
| 2002/0031320 A1 | * | 3/2002 | Nagayama et al. | 385/127 |
| 2002/0059816 A1 | * | 5/2002 | Nagayama et al. | 65/435 |
| 2002/0095955 A1 | * | 7/2002 | Ball et al. | 65/475 |
| 2002/0097774 A1 | * | 7/2002 | Simons et al. | 373/157 |
| 2002/0116954 A1 | * | 8/2002 | Terrell, Jr. | 65/384 |
| 2002/0144523 A1 | * | 10/2002 | Orita et al. | 65/537 |
| 2004/0107736 A1 | * | 6/2004 | Schuepbach et al. | 65/435 |
| 2005/0115278 A1 | * | 6/2005 | Mattila | 65/533 |
| 2005/0204778 A1 | | 9/2005 | Korsten | |

FOREIGN PATENT DOCUMENTS

| | | | |
|---|---|---|---|
| EP | 0302121 | * | 2/1989 |
| EP | 1557400 A2 | | 7/2005 |
| SU | 660949 | | 5/1979 |
| SU | 858294 | | 9/1991 |
| WO | WO 03059831 A1 | * | 7/2003 |

OTHER PUBLICATIONS

Dutch Search Report for corresponding Dutch Application No. NL 1024943, dated Jul. 29, 2004.
European Search Report for corresponding European Application No. 04078161, completed on Feb. 7, 2006.
Chinese Office Action for corresponding Chinese Application No. 200410100572.3, dated Jul. 6, 2007.
European Office Action in counterpart European Application No. 0478161, dated Feb. 16, 2009.
European Patent Office Notice of Intention to grant European Patent Application No. 0478161, dated Sep. 11, 2009.

* cited by examiner

*Primary Examiner* — Matthew J. Daniels
*Assistant Examiner* — Jodi C Franklin
(74) *Attorney, Agent, or Firm* — Summa, Additon & Ashe, P.A.

(57) ABSTRACT

The invention relates to a method for manufacturing an optical fiber, wherein a preform is placed in a draw tower, which draw tower comprises a furnace in which one end of a preform is heated, after which an optical fiber is drawn from the heated end, wherein the heating and/or cooling of the draw furnace takes place with a maximum temperature gradient of 15° C./minute.

9 Claims, No Drawings

METHOD FOR MANUFACTURING AN OPTICAL FIBRE

The present invention relates to a method for manufacturing an optical fibre, wherein a preform is placed in a draw tower, which draw tower comprises a furnace in which one end of a preform is heated, after which an optical fibre is drawn from the heated end.

Such a method is known per se from U.S. Pat. No. 6,381,990. According to said U.S. patent, heat sources generating a relatively high temperature are needed for drawing optical fibres from glass preforms, with two heat sources mainly being utilized for drawing such fibres, viz. zirconia furnaces and graphite furnaces. Such draw furnaces generally operate at temperatures higher than about 1900° C., in particular about 2050° C. A disadvantage associated with zirconia induction furnaces is that extended use and thermomechanical stresses cause cracks in the furnace wall. Said cracking causes zirconia particles to migrate from the inner surface of the furnace onto the preform and/or the optical fibre being drawn from the preform, resulting in substantially weakened fibre and unacceptable product losses. Moreover, it is stated in said publication that zirconia induction furnaces are sensitive to rapid changes in temperature. To prevent such temperature variations, significant amounts of time are necessary for increasing and decreasing the temperatures within the furnace. It has been found that rapid heating and cooling of the furnace results in fracturing of the zirconia surface, which necessitates replacement of the muffle and results in significant furnace down time. Another type of furnace is a so-called graphite induction furnace, which is susceptible to oxidation at temperatures approaching about 450° C. To prevent such oxidation, an inert atmosphere is used in the furnace, whilst according to the aforesaid U.S. patent a special sealing construction is provided to minimize the ingress of oxygen from the environment.

In a draw tower in which a carbon heating element is used, a small portion of the glass of the preform will evaporate in practice, due to the high temperatures that prevail in the furnace. Said gaseous $SiO_2$ will precipitate at relatively less hot places in the furnace and form a white layer there. It is also a known fact, however, that gaseous $SiO_2$ can react with the carbon parts of the furnace at such high temperatures, during which process silicon carbide particles are formed, which deposit on said carbon parts of the furnace. When such silicon carbide particles migrate onto the preform and/or the optical fibre, said particles may in particular cause fracture of the optical fibre, which leads to unacceptable product losses. In practice, in order to reduce the negative influence of such silicon carbide particles as much as possible, the furnace is cooled and cleaned after a drawing operation, after which the furnace is heated anew for performing a next drawing operation. It will be apparent that the cooling, cleaning and reheating of the furnace takes a great deal of time and labour, as a result of which the effective operating time of the draw power is limited to a certain extent.

Thus it is an object of the present invention to provide a method for manufacturing an optical fibre, wherein the efficiency of the draw tower, viz. the period during which optical fibre is actually being drawn from an optical preform, is considerably improved in comparison with the existing situation.

Another object of the present invention is to provide a method for manufacturing an optical fibre, wherein the occurrence of optical fibre fractures is reduced to a minimum.

Yet another object of the present invention is to provide a method for manufacturing an optical fibre, wherein the phenomenon of silicon carbide particles becoming detached from the inner wall of the furnace is reduced to a minimum.

The method as referred to in the introduction is characterized in that the heating and/or cooling of the draw furnace takes place with a maximum temperature gradient of 15° C./minute, in particular a maximum temperature gradient of 5° C./minute.

The present inventors have found that sudden temperature changes occurring in a specific part of the furnace on which silicon carbide particles are deposited may lead to optical fibre fracture. It is assumed that the silicon carbide particles will become detached from the furnace wall upon such a sudden temperature change and subsequently migrate onto the optical fibre that is being drawn, as a result of which the optical fibre is weakened to such an extent that fracture of the optical fibre may occur. The aforesaid temperature changes mainly occur upon introduction of the preform into the furnace or removal of the preform from the furnace, wherein the maximum temperature increase or decrease of the furnace during a period of one minute between heating and cooling of the furnace must be limited to a value of maximally 15° C./minute, in particular maximally 5° C./minute, so as to keep the negative effects of the silicon carbide particles, viz. said particles becoming detached from the inner wall and causing fracture of the optical fibre, within bounds. The embodiment comprising passive heating or cooling, for example caused by the introduction of a cold preform, must be considered to fall within the scope of the present invention as well.

It should be understood that the problem of small contaminations migrating onto the optical fibre will not occur in a clean furnace, for example a furnace which has previously undergone periodic cleaning. The limiting values for heating and/or cooling as mentioned in the present disclosure relate to a contaminated furnace, viz. a furnace in which particles containing $SiO_2$ and SiC are present on the inner wall, which contaminations become detached from the furnace wall upon extreme temperature variations as defined in the claims.

The present invention will be explained in more detail hereinafter by means of a number of examples, in which connection it should be noted, however, that the present invention is by no means limited to such special examples.

EXAMPLE 1

A number of experiments were carried out to determine the influence of the temperature variations in the furnace on the occurrence of fractures in the final optical fibre, in which the maximum temperature change in the draw furnace caused by the introduction of a preform was varied. An optical preform was placed in a draw tower, after which the optical fibres obtained from the first 15 centimeters of the preform were examined for fractures. Prior to said examination for fractures, the optical fibres were subjected to 1% stretch over the total length thereof, using a so-called "proof test machine". The results of the introduction of the preform are shown in Table 1. A temperature decrease is indicated by a minus sign, a temperature increase is indicated by a plus sign.

TABLE 1

The effect of the maximum temperature gradient upon introduction of a preform into a draw furnace on the number of fractures of the optical fibre being obtained.

| Maximum temperature gradient (° C./minute) | Fractures per fibre length (number) |
|---|---|
| −20 | 18 |
| −17 | 16 |
| −15 | 15 |
| −10 | 13 |
| −5 | 9 |
| −2 | 10 |

The reference measurement is based on an amount of 10 fractures per fibre length as determined, obtained with a preform placed in a "clean", freshly heated draw furnace. Such a clean furnace is assumed to be free from SiO2 contaminations. From Table 1 it is apparent that a temperature gradient of −20° C./minute results in almost double the number of fractures per fibre length, compared to the reference measurement. When the maximum temperature gradient is reduced to a value below −15° C./minute, an increase of only 50% is observed, which is an acceptable value. A further decrease to a value of −5° C./minute results in the number of fractures falling below the reference value.

EXAMPLE 2

The same device as described in Example a 1 was used, but the temperature in the draw furnace during the drawing of the optical fibre from the heated preform was varied, the results being shown in the Table 2 below.

TABLE 2

The number of fractures per fibre length caused by the change in temperature during the drawing process.

| Maximum temperature gradient (° C./minute) | Fractures per fibre length (number) |
|---|---|
| −20 | 20 |
| −18 | 17 |
| −17 | 18 |
| −15 | 14 |
| −5 | 10 |
| +2 | 8 |
| +4 | 9 |
| +8 | 13 |

From the results of Table 2 it follows that a temperature change of −20° C./minute during drawing results in double the number of fractures per fibre length. An increase of maximally 50% of the number of fractures compared to the reference value is observed when a maximum temperature gradient of −15° C./minute is used. A very small number of fractures is observed when a maximum temperature gradient of +5° C./minute is used.

The invention claimed is:

1. A method for drawing an optical fibre in a way that reduces the occurrence of optical fibre fractures, comprising:
introducing an optical preform to a draw tower that comprises a draw furnace that is operating at a temperature of at least about 1900° C., the draw furnace having a carbon heating element, wherein the draw furnace has an inner surface that is contaminated with particles of silicon carbide (SiC) and/or silicon dioxide ($SiO_2$), and wherein the temperature of the draw furnace decreases upon the introduction of the optical preform;
heating the optical preform; and
drawing an optical fibre from the heated optical preform;
wherein, during the step of introducing the optical preform to the draw tower, the temperature change in the draw furnace is limited to a maximum temperature increase or decrease of 15° C./minute to reduce the migration of contaminants from the draw furnace onto the optical preform and/or the optical fibre.

2. A method according to claim 1, wherein the step of introducing the optical preform to the draw tower comprises positioning a cold optical preform in the draw tower.

3. A method according to claim 1, wherein the step of introducing the optical preform to the draw tower comprises providing a draw furnace that, since its last cleaning, had been used to draw optical fibre from another optical preform.

4. A method according to claim 1, wherein the step of introducing the optical preform to the draw tower comprises positioning the optical preform in a draw furnace whose inner surface is contaminated with particles of silicon carbide (SiC).

5. A method according to claim 1, wherein, during the step of introducing the optical preform to the draw tower, the temperature change in the draw furnace is limited to a maximum temperature increase or decrease of about 10° C./minute.

6. A method according to claim 1, wherein, during the step of introducing the optical preform to the draw tower, the temperature change in the draw furnace is limited to a maximum temperature increase or decrease of about 5° C./minute.

7. A method according to claim 1, wherein, during the drawing of the optical fibre from the first 15 centimeters of optical preform, the temperature change in the draw furnace is limited to a maximum temperature increase or decrease of about 15° C./minute.

8. A method according to claim 1, wherein, during the drawing step, the temperature change in the draw furnace is limited to a maximum temperature increase or decrease of about 5° C./minute.

9. A method according to claim 1,
wherein, after the temperature of the draw furnace decreases upon the introduction of the optical preform, the step of introducing the optical preform to the draw tower comprises reheating the draw furnace to increase its temperature to at least 1900° C.

* * * * *